United States Patent
Burdick

(10) Patent No.: US 6,621,688 B1
(45) Date of Patent: Sep. 16, 2003

(54) ELECTRICAL DISTRIBUTION SYSTEM HAVING INTEGRAL JUNCTION BOX FOR INSTRUMENT PANEL APPLICATION

(75) Inventor: Robert C. Burdick, Romulus, MI (US)

(73) Assignee: Alcoa Fujikura Limited, Franklin, TN (US)

( * ) Notice: Subject to any disclaimer, the term of this patent is extended or adjusted under 35 U.S.C. 154(b) by 0 days.

(21) Appl. No.: 10/179,369

(22) Filed: Jun. 26, 2002

(51) Int. Cl.[7] .............................. H02G 1/00; H02B 1/10
(52) U.S. Cl. ..................... 361/627; 174/72 A; 180/90; 296/70; 439/34
(58) Field of Search ................... 439/34, 540.1, 439/246–248; 307/10.1, 148; 296/70, 72, 208; 174/72 A; 180/90; 361/627, 641, 644, 647, 807, 809, 810, 826, 827

(56) References Cited

U.S. PATENT DOCUMENTS

| | | | |
|---|---|---|---|
| 4,910,641 A | 3/1990 | Yanase | 361/364 |
| 4,942,499 A | 7/1990 | Shibata et al. | 361/428 |
| 5,324,203 A | 6/1994 | Sano et al. | 439/34 |
| 5,353,190 A * | 10/1994 | Nakayama et al. | 361/647 |
| 5,442,518 A | 8/1995 | Beam | 361/690 |
| 5,676,552 A | 10/1997 | Fukuda et al. | 439/34 |
| 5,678,877 A | 10/1997 | Nishijima et al. | 296/70 |
| 5,712,764 A | 1/1998 | Baker et al. | 361/690 |
| 5,771,575 A | 6/1998 | Onizuka et al. | 29/868 |
| 5,805,402 A * | 9/1998 | Maue et al. | 361/93 |
| 5,811,732 A * | 9/1998 | Beam | 174/72 A |
| 5,856,908 A | 1/1999 | Takiguchi et al. | 361/690 |
| 5,857,726 A | 1/1999 | Yokoyama et al. | 296/70 |
| 6,048,020 A | 4/2000 | Gronowicz et al. | 296/70 |
| 6,062,888 A | 5/2000 | Takiguchi | 439/248 |
| 6,095,272 A | 8/2000 | Takiguchi et al. | 180/90 |
| 6,257,897 B1 | 7/2001 | Kubota | 439/34 |

* cited by examiner

Primary Examiner—Gerald Tolin
(74) Attorney, Agent, or Firm—Douglas J. McEvoy; Tracey D. Beiriger

(57) ABSTRACT

An assembly for supplying vehicle subsystems associated with an instrument panel. A panel structural architecture includes a forward facing side within which are defined a series of partially recessed and interconnected channels. A junction box is secured or integrally affixed in some fashion to the structural architecture and an electrically communicable network extending from the junction box is likewise secured to surfaces of the panel structural architecture. First selected branches of the network terminate in a plurality of high current connectors extending from first locations. Second selected branches of the network terminate in a plurality of low current connectors extending from further locations. An instrument panel skin is applied over the structural architecture and incorporates electrical subsystems with input connectors matingly engageable with both the high and low current connectors associated with the structural architecture.

11 Claims, 2 Drawing Sheets

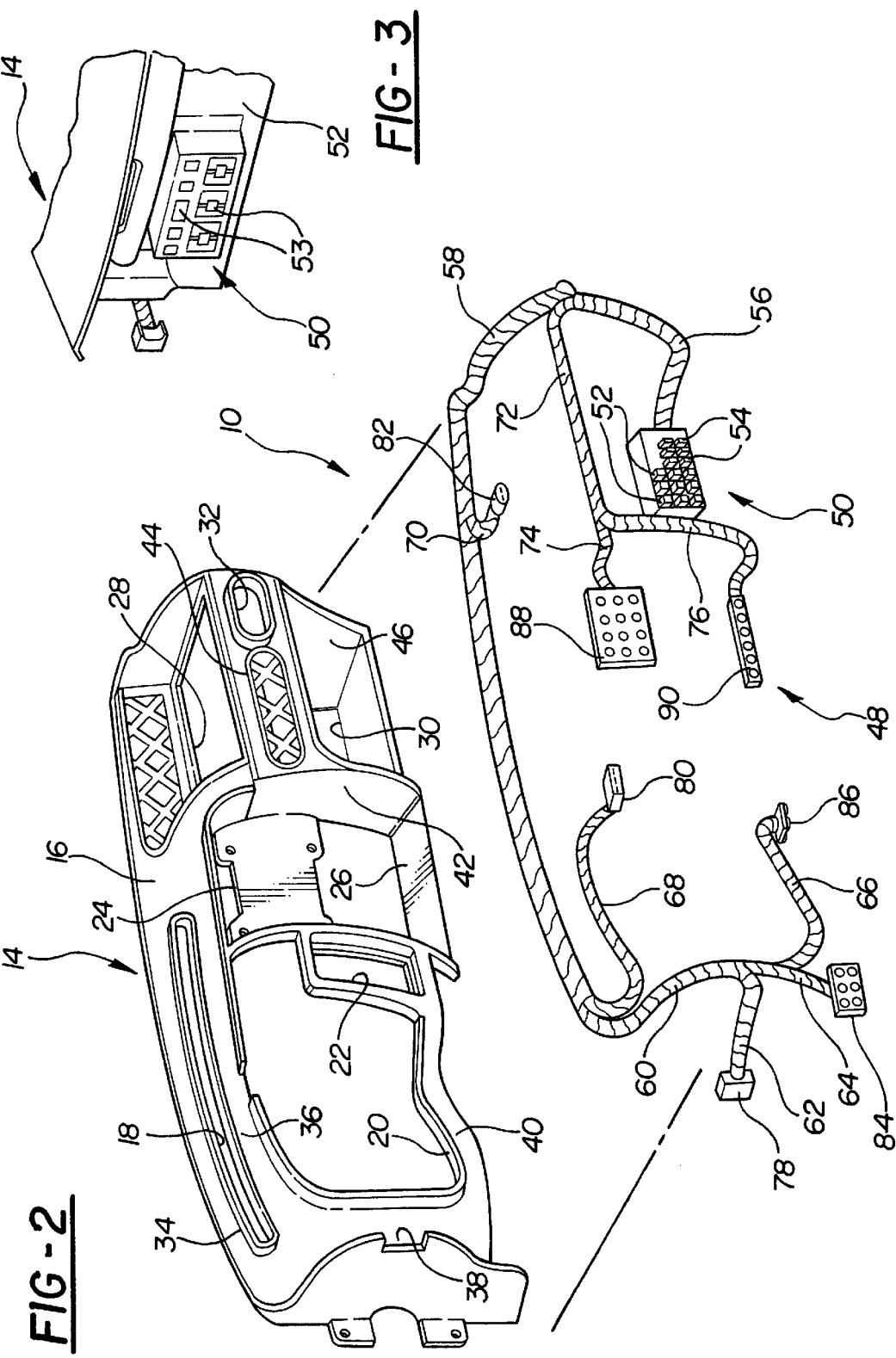

ELECTRICAL DISTRIBUTION SYSTEM HAVING INTEGRAL JUNCTION BOX FOR INSTRUMENT PANEL APPLICATION

FIELD OF THE INVENTION

The present invention relates generally to instrument panel electrical harness assemblies. More particularly, the present invention discloses a combination electrically communicable network, such as including electrical harnesses, and a junction box assembly incorporated into an instrument panel structural architecture for supplying a number of individual vehicle subsystems.

BACKGROUND OF THE INVENTION

Current vehicle manufacturing techniques and processes contemplate the incorporation of an electrical distribution system into a vehicle instrument panel only after assembly of the various devices and subsystems associated with the vehicle. The shortcomings of this manufacturing technique include far from optimum wire routing, protection, retention and completion of assembly. Additionally, this conventional practice of vehicle manufacture entails additional component requirements for the system, increasing the system cost, weight and assembly.

Existing vehicle electrical distribution systems are also currently manufactured by being first pre-assembled, tested and shipped to the customer (typically either an automotive manufacturer or top tier supplier) who then assembles it to a structural part or parts (such as associated vehicle components and/or subassemblies) of the instrument panel cockpit system. Further assembly steps associated with the instrument panel includes the installation of an electrical junction box or fuse panel, which is then connected to the electrical distribution system. Conventional electrical distribution systems are further typically designed to include service loops (conventionally known as electrical pigtails), and which are included in the design of the distribution system and to facilitate connectivity to the other associated instrument panel devices.

An additional example of an apparatus and method of assembling vehicle instrument panel structural and electronic components is set forth in U.S. Pat. No. 5,712,764, issued to Baker. The Baker references teaches fabricating an insulative instrument panel base substrate, applying a conductive pattern to the base substrate and attaching electronic components to the base substrate in electrical communication with the conductive pattern. In this fashion, the electronic devices, plastic instrument panel support structure, and climate control products are combined such that the assembly process is streamlined while packaging efficiency is improved, thermal dissipation enhanced, and costs reduced. Other examples of wire harness devices for use in instrument panels include U.S. Pat. Nos. 5,856,908 and 6,062,888, both issued to Takaguchi.

SUMMARY OF THE INVENTION

The present invention discloses a combination electrically communicable network (such as electrical wire, fiber optic or flex circuit harness) and junction box assembly incorporated into an instrument panel structural architecture and for supplying a number of individual vehicle subsystems. As discussed previously, the present invention is an improvement over prior art instrument panel assembly and wiring procedures in that it provides a fully electrical output ready assembly, including both an electrical junction box and a harness network, incorporated into an instrument panel structural architecture.

The communicating (harness) network, and such as is provided by wire, fiber optic or flex circuit harnesses, is typically laid into partially recessed channels configured within a forward facing side of the three dimensionally constructed panel structure architecture. It is also contemplated that other and additional variations of the communicating network may include in-layed or in-molded conductive patterns or materials affixed directly to the surfaces of the panel structure architecture and therefore dispensing with the need for connectors.

First selected branches of the harness network terminate in high current connectors according to a first structural configuration, such as are conventionally known, and extend from a first plurality of locations of the panel structural architecture. Second selected branches of the harness network also terminate in low current connectors, such as which may further be constructed of a conductive elastomer material having at least one substantially planar surface and a plurality of raised button portions extending in a given direction from the planar surface and through which current flowing communication is established with the associated electrical system. The low current connectors extend from a further plurality of locations of the panel structural architecture.

An instrument panel skin is applied over the structural architecture and incorporates a first plurality of electrical subsystems having additional associated connectors matingly engageable with the afore-mentioned high current connectors. The panel skin further incorporates a second plurality of electrical subsystems having still additional connectors according to an appropriate design for matingly engaging with the associated low current connectors.

Additional features include the junction box being secured, such being interpreted as including being attached by fasteners, molded or otherwise affixed (integrally or otherwise) to a rearside and corner location of the instrument panel structural architecture. The three dimensional structural architecture is further configured with a plurality of interiorly defined apertures adapted to receive heating, ventilation and air conditioning (HVAC) structure associated with the vehicle and to facilitate the completed assembly and connection of the instrument panel architecture with the various components and subassemblies of the vehicle.

BRIEF DESCRIPTION OF THE DRAWINGS

Reference will now be made to the attached drawings, when read in combination with the following detailed description, wherein like reference numerals refer to like parts throughout the several views, and in which:

FIG. 2 is a further exploded view of the instrument panel structural according to the present invention and the associated electrical harness with both high and low current output connectors associated with various of the vehicle subsystems associated with the instrument panel; and FIG. 3 is a rearside sectional view of a portion of the structural architecture and illustrating the junction box for converting a high current electrical input to associated high and low current outputs.

DETAILED DESCRIPTION OF PREFERRED EMBODIMENTS

Figure 1:
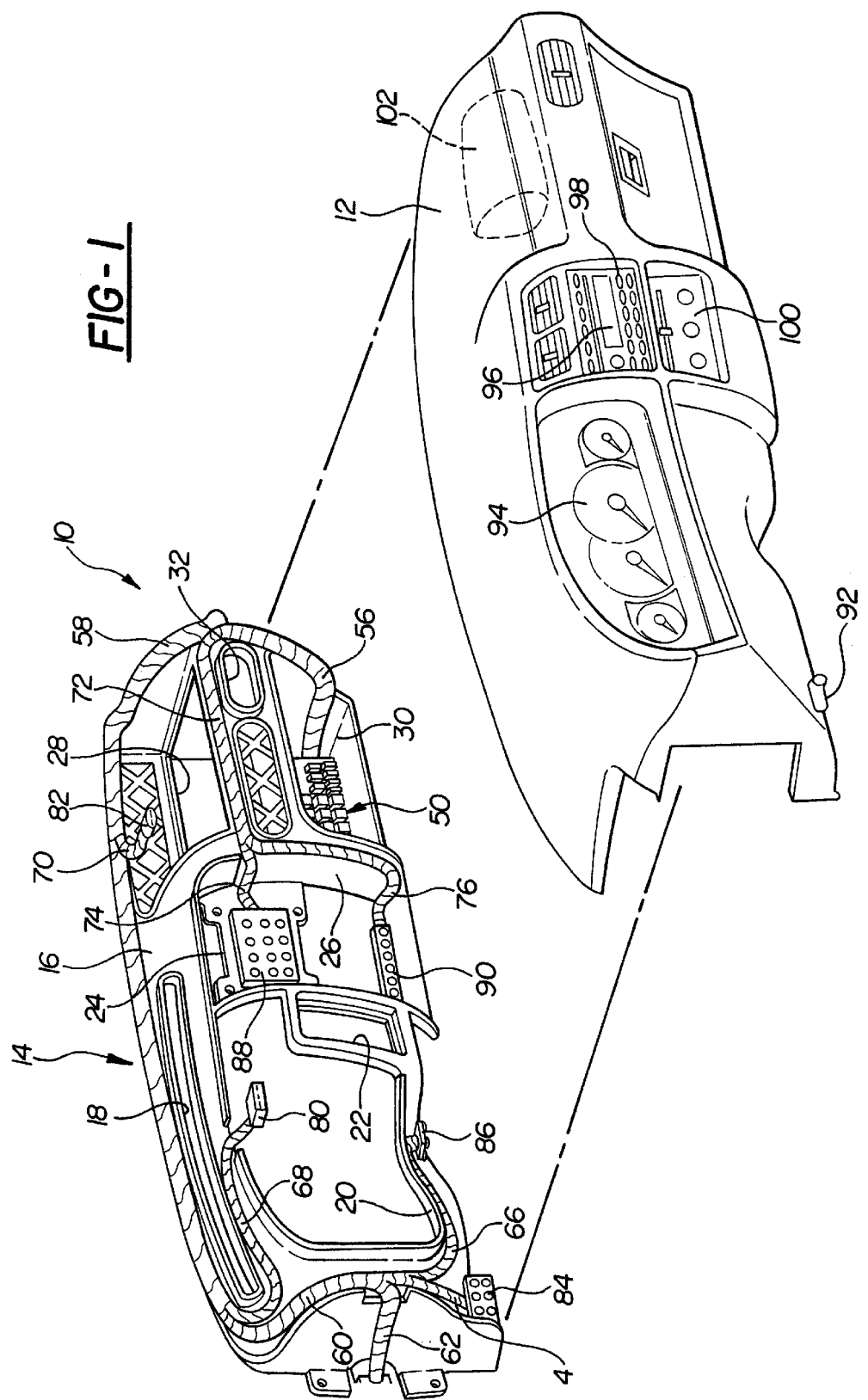
FIG. 1 is an exploded perspective view illustrating the combination electrical harness and junction box assembly incorporated into an instrument panel structural achitecture, and which is secured to a reverse face of an instrument panel skin with integral cluster and controls according to the present invention.

Referring now to the exploded views of FIGS. 1 and 2, an electrical distribution assembly is illustrated at 10 for use with an instrument panel skin 12 (FIG. 1) according to a preferred embodiment of the present invention. As previously stated, the present invention is an improvement over prior art instrument panel (IP) assembly and wiring procedures in that it provides a fully electrical output ready assembly, including both an electrical junction box and an electrically communicable (harness) network, incorporated into an instrument panel structural architecture.

An instrument panel structural architecture is indicated at 14 and is constructed as a three dimensional object having a specified length, width and depth. The panel structure architecture 14, also known in trade parlance as a "cartridge unit" includes a forward facing side 16 (as well as an associated reverse and hidden rear facing side). The configured architectural structure 14 may be constructed of a suitable and durable plasticized or like composite material exhibiting the suitable properties of being substantially lightweight, yet durable and resilient in nature. A plurality of interiorly configured apertures, defined by such as associated and inwardly facing surfaces 18, 20, 22, 24, 26, 28, 30 and 32, are also configured within the interior of the IP structural architecture 14 and in order to facilitate the installation of various components and subassemblies associated with the vehicle, such including the HVAC plenum components (as are well known in the art) as well as possibly other and additional systems integrations into the structural architecture.

The forward facing side 16 of the structural architecture 14 further includes a series of partially recessed and interconnecting channels. Referring again to the exploded perspective of FIG. 2, a series of such channel locations are indicated at 34, 36, 38, 40, 42, 44, 46, et seq., and which in combination define a partially recessed network for receiving an associated and electrically communicable network (referenced generally at 48 in FIG. 2 in one preferred illustration as a harness network).

A junction box 50 is provided and is secured, such as previously stated as including being attached by fasteners, molded or otherwise affixed (integrally or otherwise) to the rear facing side and corner (see now at 52 in FIG. 3) of the IP structural architecture 14. A rear side of the junction box 50 also includes additional electrical and mechanical interfaces 53 for communicating to various connectors (as will be further described in more detail) as well as other communicating harnesses, such as associated with the vehicle engine.

As is further known in the art, the junction box 50 converts a high current input from the vehicle's electrical generating components, this being passed through such as common bus bars, relays, switches (see also at 52 and 54) and the like, and then issued from the junction box 50 as both high and low current outputs. The junction box 50 further operates to provide low current splicing, known in the relevant art as "pass through", and in order that a single harness may provide a multiplicity of electrical inter-communications.

The electrically communicable network 48 is connected to the junction box by trunk branch 56, the network 48 further consisting of a plurality of interconnecting and extending branches and which define the overall extending network 48. In particular, reference is made is made to branches 58, 60, 62, 64, 66, 68, 70, 72, 74 and 76 interconnecting with and extending from the trunk branch 56. As best illustrated in FIG. 1, the network 48 is laid into the interconnecting channels (see again locations 34–46, et seq.) of the IP structural architecture 14 and is typically held in place by hard fastener connectors (not shown). It is also envisioned that any suitable type of fastener or connector may be employed to secure and hold the harness network 48 in place within the structural architecture 14 and so that, upon subsequent application and installation of the instrument panel skin 12 to front facing surface 16 of the structural architecture, the network branches are completely recessed and concealed.

It is further understood that, while traditional wire harnesses are known for use in the interconnecting and communicating branches 56–76 making up the network 48, other potential applications could include the branches 56–76 being constructed of fiber optic lines as well as a hybrid flex circuit. As is also known, a flex circuit construction includes the provision of a substantially flattened and plasticized material, such as Mylar composites and the like, and into which are soldered or otherwise applied conductive patterns. The flex circuit, fiber optic or other suitable construction making up the communicating network may be incorporated into the branches 56–76 as presently disclosed and within the ability of one of ordinary skill in the art.

It is also contemplated that other and additional variations of the communicating network 48 may include in-layed or in-molded conductive patterns or materials affixed directly to the surfaces of the panel structure architecture and therefore dispensing with the need for connectors. Along these lines, it is also envisioned that a screen printing process may also be employed to secure the an electrically conductive pattern (corresponding to the network 48) to the associated recessed surfaces of the structural architecture 14.

Referring again to the branches 56–76 making up the harness network 48, a first subset plurality of these, identified at 62, 68, and 70, terminate in corresponding and high current connectors, see at 78, 80 and 82, respectively, and which are designed according to a first structural configuration. The connectors 78, 80 and 82, according to configurations typically known in the art and which effectuate two way electrical communication, are constructed of a conventional terminal pin and socket design and extend from a first plurality of locations of the panel structural architecture, as best illustrated again in FIGS. 1 and 2. As will further be explained in additional detail, the connectors 78, 80 and 82 correspond to outputs of electrical subsystems of associated vehicle components as a window lifting mechanism, instrument panel cluster display, and air bag activating mechanism.

A second selected subset of branches of the harness network, see further at 64, 66, 74 and 76, likewise terminate in a plurality of low current connectors, see respectively at 84, 86, 88 and 90, according to a second structural configuration, and extend from a further plurality of locations of the panel structural architecture as also shown. Each of the low current connectors 84, 86, 88 and 90 are constructed of a conductive elastomeric material having a substantially planar surface. Each further includes a plurality of raised button portions, extending in a given direction from the associated planar surface and through which current flowing communication is established with outputs of associated vehicle electrical subsystems, in these instances including such as a low current head lamp (associated with connector 84), steering column controls (connector 86), vehicle radio/GPS system (connector 88) and HVAC controls (connector 90).

As previously stated, the instrument panel skin 12 is applied over the structural architecture 14 and secured in conventional fashion. The panel skin further incorporates many of the electrical subsystems, particularly those associated with the low current applications, and includes associated connectors (not shown) which are particularly designed and suited for use with the conductive and elastomeric design of the connectors 84, 86, 88 and 90. Reference is particularly made in FIG. 1 to components associated with the instrument panel skin 12 and including such as head lamp knob 92, IP cluster display 94 (in this particular case associated with high current connector 80), clock 96, radio controls 98, HVAC controls 100, and air bag activating mechanism 102 see also again high current connector 82).

Accordingly, it is understood that the electrical distribution assembly of the present invention incorporates an instrument panel harness and junction box into a self-contained unit in a non-obvious fashion over the prior art. The architectural design of the structure 14 further provides an increased ability for incorporating additional system integrations into the instrument panel, such including steering column, pedals, and other units in addition to those described above. An additional advantage of the structural architecture and assembly of the present invention is that it provides the ability to ship the unit to a final assembly location where it is then integrated with other subassemblies which make up the instrument panel system.

Having described the presently preferred embodiments, it is to be understood that the invention may be otherwise embodied within the scope of the appended claims.

What is claimed is:

1. An electrical distribution assembly for supplying a number of individual vehicle subsystems associated with an instrument panel, said assembly comprising:
    an instrument panel structural architecture having a specified shape and size;
    a junction box secured to said panel structural architecture;
    an electrically communicable network communicating with and extending from said junction box;
    a first selected branch of said communicable network terminating in at least a first high current connector according to a first structural configuration and extending from a location of said panel structural architecture;
    a second selected branch of said harness network terminating in at least a second low current connector according to a second structural configuration and extending from a further location of said panel structural architecture; and
    an instrument panel skin applied over said structural architecture, said panel skin incorporating a first electrical subsystem having at least one additional connector matingly engageable with said high current connector according to said first structural configuration, said panel skin incorporating a second electrical subsystem having a further connector matingly engageable with said low current connector according to said second structural configuration.

2. The electrical distribution assembly as described in claim 1, said instrument panel structural architecture further comprising a three dimensional construction with a plurality of configured interior apertures adapted to receive HVAC plenum structure associated with the vehicle.

3. The electrical distribution assembly as described in claim 1, further comprising said junction box securing to a rearside and corner location of said instrument panel structural architecture.

4. The electrical distribution assembly as described in claim 1, said electrically communicable network further comprising a plurality of wire harnesses.

5. The electrical distribution assembly as described in claim 1, said electrically communicable network further comprising a plurality of fiber optic harnesses.

6. The electrical distribution assembly as described in claim 1, said electrically communicable network further comprising a plurality of flex circuit harnesses.

7. The electrical distribution assembly as described in claim 2, a forward facing side of said three dimensionally constructed instrument panel structural architecture defining a series of partially recessed and interconnected channels for receiving said electrically communicable network.

8. The electrical distribution assembly as described in claim 1, said low current connectors further comprising a conductive elastomer material having at least one substantially planar surface, a plurality of raised button portions extending in a given direction from said planar surface and through which current flowing communication is established with said associated electrical subsystem.

9. The electrical distribution assembly as described in claim 8, said low current connectors each further comprising a specified shape and size, said first electrical subsystem further comprising a plurality of subsystems including at least one of a clock, radio, GPS tracking system, HVAC control settings, passenger compartment lamp, and steering column controls.

10. The electrical distribution assembly as described in claim 1, said high current connectors further comprising a terminal having a specified shape and size, said second electrical subsystem further comprising a plurality of subsystems including at least one of a instrument panel cluster display, window winding mechanism, and air bag triggering mechanism.

11. An electrical distribution assembly for supplying a number of individual vehicle subsystems associated with an instrument panel, said assembly comprising:
    an instrument panel structural architecture having a three dimensional construction with a specified shape and size, a forward facing side of said panel structure architecture further comprising a series of partially recessed and interconnected channels;
    a junction box secured to said panel structural architecture;
    an electrically communicable network communicating with and extending from said junction box, said network being receivingly engaged within said recessed and interconnected channels;
    first selected branches of said harness network terminating in a plurality of high current connectors according to a first structural configuration and extending from a first plurality of locations of said panel structural architecture;
    second selected branches of said harness network terminating in a plurality of low current connectors according to a second structural configuration and extending from a further plurality of locations of said panel structural architecture; and
    an instrument panel skin applied over said structural architecture, said panel skin incorporating a first plurality of electrical subsystems having connectors matingly engageable with said high current connectors, said panel skin incorporating a second plurality of electrical subsystems having further connectors matingly engageable with said low current connectors.

* * * * *